(12) United States Patent
Uziel et al.

(10) Patent No.: US 11,445,529 B2
(45) Date of Patent: Sep. 13, 2022

(54) TECHNIQUES FOR RELAYING IN SIDELINK COMMUNICATIONS

(71) Applicant: QUALCOMM Incorporated, San Diego, CA (US)

(72) Inventors: Lior Uziel, Hod Hasharon (IL); Omri Mamo, Petah Tikva (IL)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/986,048

(22) Filed: Aug. 5, 2020

(65) Prior Publication Data

US 2022/0046659 A1 Feb. 10, 2022

(51) Int. Cl.
*H04W 72/12* (2009.01)
*H04W 88/04* (2009.01)
*H04W 92/18* (2009.01)

(52) U.S. Cl.
CPC ... *H04W 72/1263* (2013.01); *H04W 72/1278* (2013.01); *H04W 88/04* (2013.01); *H04W 92/18* (2013.01)

(58) Field of Classification Search
CPC ......... H04W 72/1263; H04W 72/1278; H04W 88/04; H04W 92/18; H04W 72/0493; H04W 28/0278; H04W 72/1242; H04W 72/042; H04W 28/26; H04W 72/0406; H04W 16/26; H04W 4/40; H04L 45/20; H04L 5/26; H04L 1/1825; H04L 1/1812
See application file for complete search history.

(56) References Cited

U.S. PATENT DOCUMENTS

| 2017/0171859 | A1* | 6/2017 | Nimbalker | ........ H04W 72/1289 |
| 2018/0092122 | A1* | 3/2018 | Babaei | ................ H04W 72/042 |
| 2019/0239264 | A1* | 8/2019 | Hahn | ................... H04W 72/042 |
| 2020/0163155 | A1* | 5/2020 | Lee | ....................... H04B 7/0632 |

(Continued)

FOREIGN PATENT DOCUMENTS

| EP | 3567909 A1 | 11/2019 |
| EP | 3826426 A1 | 5/2021 |

(Continued)

OTHER PUBLICATIONS

International Search Report and Written Opinion—PCT/US2021/040842—ISA/EPO—dated Nov. 16, 2021.

*Primary Examiner* — Ayaz R Sheikh
*Assistant Examiner* — Louis Samara
(74) *Attorney, Agent, or Firm* — Dalei Dong; Holland & Hart LLP

(57) ABSTRACT

Methods, systems, and devices for wireless communications are described. A first user equipment (UE) may receive, from a second UE and on a first set of resources, a first control information associated with sidelink communication. The first UE may also receive, from the second UE and on a second set of resources, a first shared channel information associated with the sidelink communication. In some examples, the first UE may identify a third set of resources associated with a retransmission of the first control information and a fourth set of resources associated with a retransmission of the first shared channel information. The first UE may then transmit the retransmission of the first control information on the third set of resources and the retransmission of the first shared channel information on the fourth set of resources.

30 Claims, 11 Drawing Sheets

(56) References Cited

U.S. PATENT DOCUMENTS

| | | | |
|---|---|---|---|
| 2020/0228254 A1* | 7/2020 | Ma | H04L 1/189 |
| 2020/0389900 A1* | 12/2020 | Lee | H04W 72/0493 |
| 2021/0007096 A1* | 1/2021 | Huang | H04W 72/02 |
| 2021/0021536 A1* | 1/2021 | Ganesan | H04L 1/1896 |
| 2021/0045178 A1* | 2/2021 | Kung | H04W 28/0278 |
| 2021/0250159 A1* | 8/2021 | Su | H04W 72/0453 |
| 2021/0297994 A1* | 9/2021 | Zhang | H04W 72/0406 |
| 2021/0314935 A1* | 10/2021 | Luo | H04W 16/26 |
| 2021/0315057 A1* | 10/2021 | Baek | H04W 88/04 |
| 2021/0329648 A1* | 10/2021 | Osawa | H04W 72/0493 |
| 2021/0377710 A1* | 12/2021 | Kim | H04W 4/40 |
| 2021/0400448 A1* | 12/2021 | Adjakple | H04W 4/40 |

FOREIGN PATENT DOCUMENTS

| | | | |
|---|---|---|---|
| WO | WO-2017078783 A1 * | 5/2017 | |
| WO | WO-2020016940 A1 | 1/2020 | |
| WO | WO-2020142992 A1 | 7/2020 | |
| WO | WO-2021184255 A1 * | 9/2021 | |

\* cited by examiner

TECHNIQUES FOR RELAYING IN SIDELINK COMMUNICATIONS

FIELD OF DISCLOSURE

The following relates to wireless communications, including techniques for relaying in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communication systems may support sidelink communications. Sidelink communications may support communications within a group of UEs. For example, sidelink communications may include communications between a UE and other UEs within a coverage area including the group of UEs. Techniques for sidelink communications may be improved, so that UEs may communicate with high reliability.

SUMMARY

The described techniques relate to improved methods, systems, devices, and apparatuses that support techniques for relaying in sidelink communications. According to one or more aspects, the described techniques provide for efficient latency reduction techniques and reliable communications in wireless communications systems supporting sidelink communications. The described techniques may enable a communication device, which may be a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to echo or relay a control channel and a shared channel during a set of resources reserved for retransmission of the control channel and the shared channel by another UE. According to one or more aspects, a relay UE may receive a control information and a shared channel information from a transmitter UE. The relay UE may receive the control information and the shared channel information during a first set of resources. In some examples, the relay UE may determine that the transmitter UE has reserved a second set of resources (e.g., in a later subframe) for retransmission of the control information and the shared channel information. The relay UE may successfully decode the control information and the shared channel information, and may utilize the resources reserved for retransmission to relay the control information and the shared channel information to a third UE located outside the coverage area of the transmitter UE.

A method of wireless communication at a first UE is described. The method may include receiving, from a second UE and on a first set of resources, a first control information associated with sidelink communication, receiving, from the second UE and on a second set of resources, a first shared channel information associated with the sidelink communication, identifying a third set of resources associated with a retransmission of the first control information and a fourth set of resources associated with a retransmission of the first shared channel information, transmitting, on the third set of resources, the retransmission of the first control information, and transmitting, on the fourth set of resources, the retransmission of the first shared channel information.

An apparatus for wireless communication at a first UE is described. The apparatus may include a processor, memory coupled with the processor, and instructions stored in the memory. The instructions may be executable by the processor to cause the apparatus to receive, from a second UE and on a first set of resources, a first control information associated with sidelink communication, receive, from the second UE and on a second set of resources, a first shared channel information associated with the sidelink communication, identify a third set of resources associated with a retransmission of the first control information and a fourth set of resources associated with a retransmission of the first shared channel information, transmit, on the third set of resources, the retransmission of the first control information, and transmit, on the fourth set of resources, the retransmission of the first shared channel information.

Another apparatus for wireless communication at a first UE is described. The apparatus may include means for receiving, from a second UE and on a first set of resources, a first control information associated with sidelink communication, receiving, from the second UE and on a second set of resources, a first shared channel information associated with the sidelink communication, identifying a third set of resources associated with a retransmission of the first control information and a fourth set of resources associated with a retransmission of the first shared channel information, transmitting, on the third set of resources, the retransmission of the first control information, and transmitting, on the fourth set of resources, the retransmission of the first shared channel information.

A non-transitory computer-readable medium storing code for wireless communication at a first UE is described. The code may include instructions executable by a processor to receive, from a second UE and on a first set of resources, a first control information associated with sidelink communication, receive, from the second UE and on a second set of resources, a first shared channel information associated with the sidelink communication, identify a third set of resources associated with a retransmission of the first control information and a fourth set of resources associated with a retransmission of the first shared channel information, transmit, on the third set of resources, the retransmission of the first control information, and transmit, on the fourth set of resources, the retransmission of the first shared channel information.

Some examples of the method, apparatuses, and non-transitory computer-readable medium described herein may further include operations, features, means, or instructions for identifying sidelink control information included in a sidelink control channel, where receiving the first control information includes receiving the sidelink control channel on the first set of resources and during a first time period, determining, based on the sidelink control information, a gap between the first time period and a second time period allocated by the second UE for the retransmission of the first control information, and identifying the third set of resources associated with the retransmission of the first control information based on the first set of resources and the determined gap.

In some examples of the method, apparatuses, and non-transitory computer-readable medium described herein, transmitting the retransmission of the first control information may include operations, features, means, or instructions for transmitting an indication of the sidelink control information in the retransmission of the first control information.

Some examples of the method, apparatuses, and non-transitory computer-readable medium described herein may further include operations, features, means, or instructions for identifying a first set of attributes associated with the first shared channel information based on the sidelink control information, and identifying a second set of attributes associated with the retransmission of the first shared channel information based on the first set of attributes.

Some examples of the method, apparatuses, and non-transitory computer-readable medium described herein may further include operations, features, means, or instructions for determining that the first shared channel information may be associated with a first redundancy version based on the first set of attributes, identifying a transport block payload associated with the first shared channel information, and determining the retransmission of the first shared channel information including the identified transport block payload, where transmitting the retransmission of the first shared channel information includes transmitting the retransmission of the first shared channel information associated with a second redundancy version.

In some examples of the method, apparatuses, and non-transitory computer-readable medium described herein, a number of bits included in a circular buffer associated with the first redundancy version may be different from a number of bits included in a circular buffer associated with the second redundancy version. In some examples of the method, apparatuses, and non-transitory computer-readable medium described herein, the first set of attributes and the second set of attributes include at least one of a physical sidelink shared channel scrambling parameter, a group hopping parameter, an orthogonal code, a cyclic shift, or any combination thereof.

Some examples of the method, apparatuses, and non-transitory computer-readable medium described herein may further include operations, features, means, or instructions for including a bit in the retransmission of the first control information, where a value of the bit indicates that the transmission on the third set of resources may be an echo of the first control information. Some examples of the method, apparatuses, and non-transitory computer-readable medium described herein may further include operations, features, means, or instructions for determining that the first control information may be associated with a first redundancy version, where transmitting the retransmission of the first control information includes transmitting the retransmission of the first control information associated with a second redundancy version.

In some examples of the method, apparatuses, and non-transitory computer-readable medium described herein, a first cyclic shift associated with the first redundancy version and a second cyclic shift associated with the second redundancy version may be randomly selected. In some examples of the method, apparatuses, and non-transitory computer-readable medium described herein, the first redundancy version and the second redundancy version may be associated with the same cyclic shift.

In some examples of the method, apparatuses, and non-transitory computer-readable medium described herein, a first cyclic shift associated with the first redundancy version may be different from a second cyclic shift associated with the second redundancy version. In some examples of the method, apparatuses, and non-transitory computer-readable medium described herein, the first UE includes a capability to transmit echo of a transmission.

In some examples of the method, apparatuses, and non-transitory computer-readable medium described herein, the capability may be based on a number of previous transmissions in a subframe, an amount of gap supported by the first UE, or a combination thereof. In some examples of the method, apparatuses, and non-transitory computer-readable medium described herein, the first UE and the second UE may be included in a first coverage area and the second UE and a third UE may be included in a second coverage area. In some examples of the method, apparatuses, and non-transitory computer-readable medium described herein, the first control information includes a physical sidelink control channel and the first shared channel information includes a physical sidelink shared channel.

DETAILED DESCRIPTION

Figure 1:
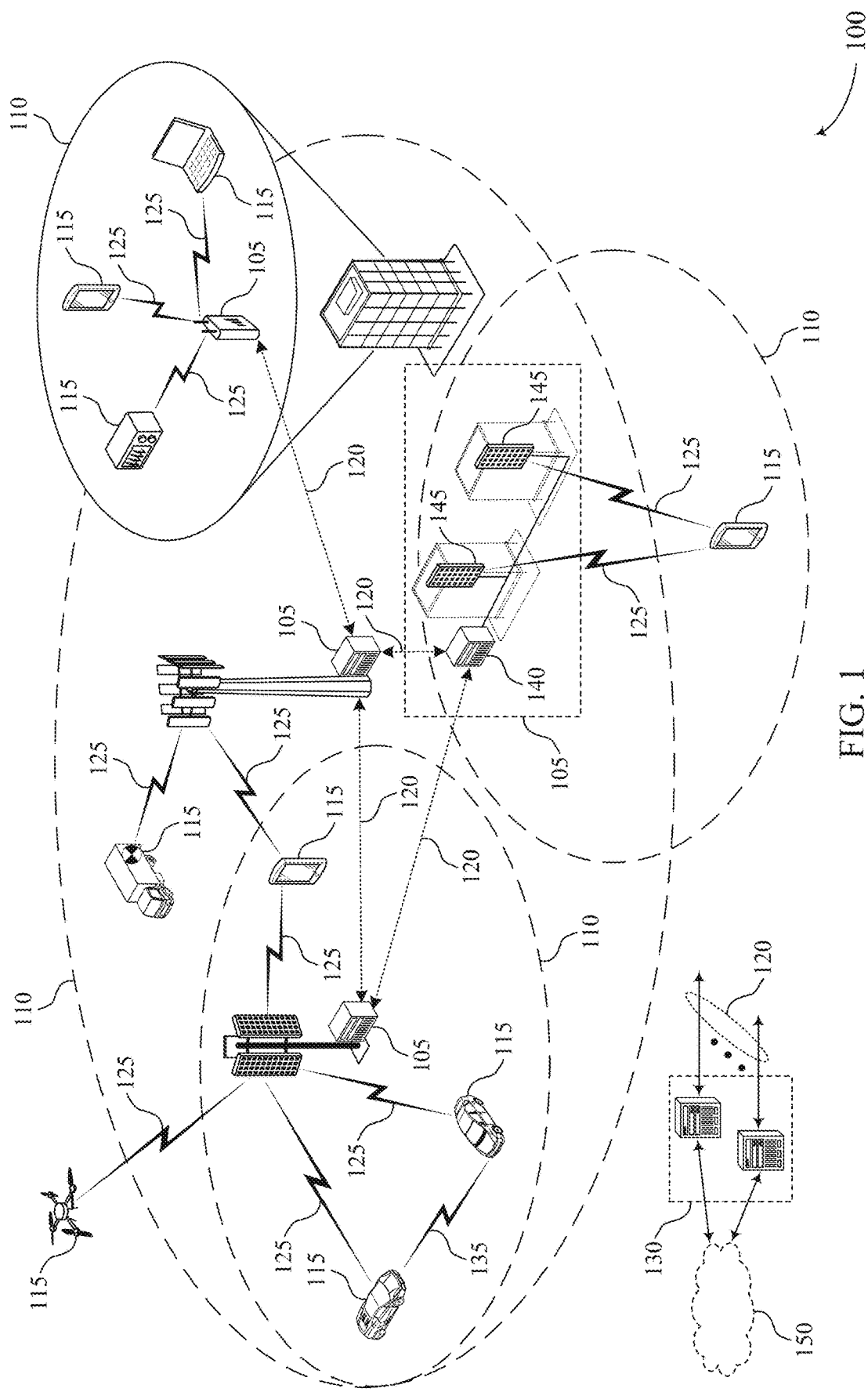
FIGS. 1 and 2 illustrate examples of wireless communications systems that support techniques for relaying in sidelink communications in accordance with various aspects of the present disclosure.

A wireless communications system may support both access links and sidelinks for communications between one or more communication devices. An access link may refer to a communication link between a UE and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. In some examples, base stations may not be involved in sidelink communications because multiple UEs on the sidelink may receive a data transmission from a single UE, or a single UE may receive data transmissions from multiple UEs. In some examples, V2X communication may support two resource allocation mechanisms. In a first example, resource may be scheduled by a base station, and in a second example, a UE may perform autonomous resource selection. In wireless communications systems supporting sidelink communications, inter-UE coordination may be improved to increase reliability and efficiency. In case of mode 2 resource allocation mechanism, a transmitter UE may perform a sensing operation to find occupied and/or available resources to utilize for an upcoming transmission. However, hidden UEs may be unaware of a neighboring UE which may result in collision of transmissions. Additionally, a coverage area provided by UEs in sidelink communications systems may be limited by UEs' transmit power. Thus, a relay UE may be used to handle upcoming collisions by relaying indication of reserved resources to UEs located outside of a coverage area of a transmitter UE. To increase resource efficiency, it may be desirable for the relay UE to implement updated methods of relaying in wireless communications systems supporting sidelink communications.

One or more aspects of the present disclosure provide for a relay UE to echo or relay a control channel and a shared channel using a set of resources allocated for retransmission of the control channel and the shared channel. In one example, a relay UE may receive, from a transmitter UE, a physical sidelink control channel and a physical sidelink shared channel during a first subframe. In some examples, the relay UE attempts to decode the received physical sidelink control channel and the physical sidelink shared channel. If the relay UE successfully decodes the physical sidelink control channel and the physical sidelink shared channel, then the relay UE may determine that the transmitter UE has reserved a set of resources for retransmission of the physical sidelink control channel and the physical sidelink shared channel. According to one or more aspects described herein, the relay UE may utilize the resources reserved for retransmission for relaying the physical sidelink control channel and the physical sidelink shared channel to a hidden UE (e.g., UE located outside the coverage area of the transmitter UE).

UEs having a capability of sidelink communications may utilize the techniques described herein to experience power saving, such as reduced power consumption and extended battery life while ensuring reliable and efficient communications in the group of UEs. In some aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with one or more aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to techniques for relaying in sidelink communications.

FIG. 1 illustrates an example of a wireless communications system 100 that supports techniques for relaying in sidelink communications in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications system may support both access links and sidelinks for communications between one or more communication devices. An access link may refer to a communication link between a UE and a base station. A sidelink may refer to any communication link between similar wireless devices (e.g., a communication link between UEs, or a backhaul communication link between base stations). In some examples, some wireless communications systems may support two modes for resource allocation. In a first example (e.g., mode 1), a base station may allocate the resources for the UEs participating in sidelink communications. In a second example (e.g., mode 2), the UEs may perform autonomous resource selection. In some cases, a transmitter UE participating in sidelink communications may not be aware if a neighboring UE is transmitting if the neighboring UE is located outside the coverage area of the transmitter UE. A relay UE may be used to handle upcoming collisions and increase coverage in wireless communications systems supporting sidelink communication. In wireless communications systems supporting V2X transmission, resources may be limited. Thus, it may be desirable for the relay UE to implement updated methods of relaying for efficient utilization of resources in wireless communications systems supporting sidelink communications.

According to one or more aspects of the present disclosure, a relay UE 115 may be configured to echo or relay a control channel and a shared channel during a set of resources reserved for retransmission of the control channel and the shared channel by the transmitter UE 115. For example, a relay UE 115 may receive a first control information on a first set of resources and a first shared channel information on a second set of resources. The relay UE 115 may then identify a third set of resources associated with a retransmission of the first control information and a fourth set of resources associated with a retransmission of the first shared channel information. For example, the relay UE 115 may identify that the transmitter UE 115 has reserved the third set of resources for retransmitting of the first control information and the fourth set of resources for retransmitting of the first shared channel information. In some examples, the relay UE 115 may transmit a second transmission associated with the first control information on the third set of resources and may transmit a second transmission associated with the first shared channel information on the fourth set of resources. In some examples, the second transmission including the first control information and the second transmission associated with the first control information may include different control information payloads. For example, the first control information may include a first value (e.g., 0) in a "retransmission bit field" and the second transmission including the first control information may include a second value (e.g., 1) in the "retransmission bit field."

Figure 2:
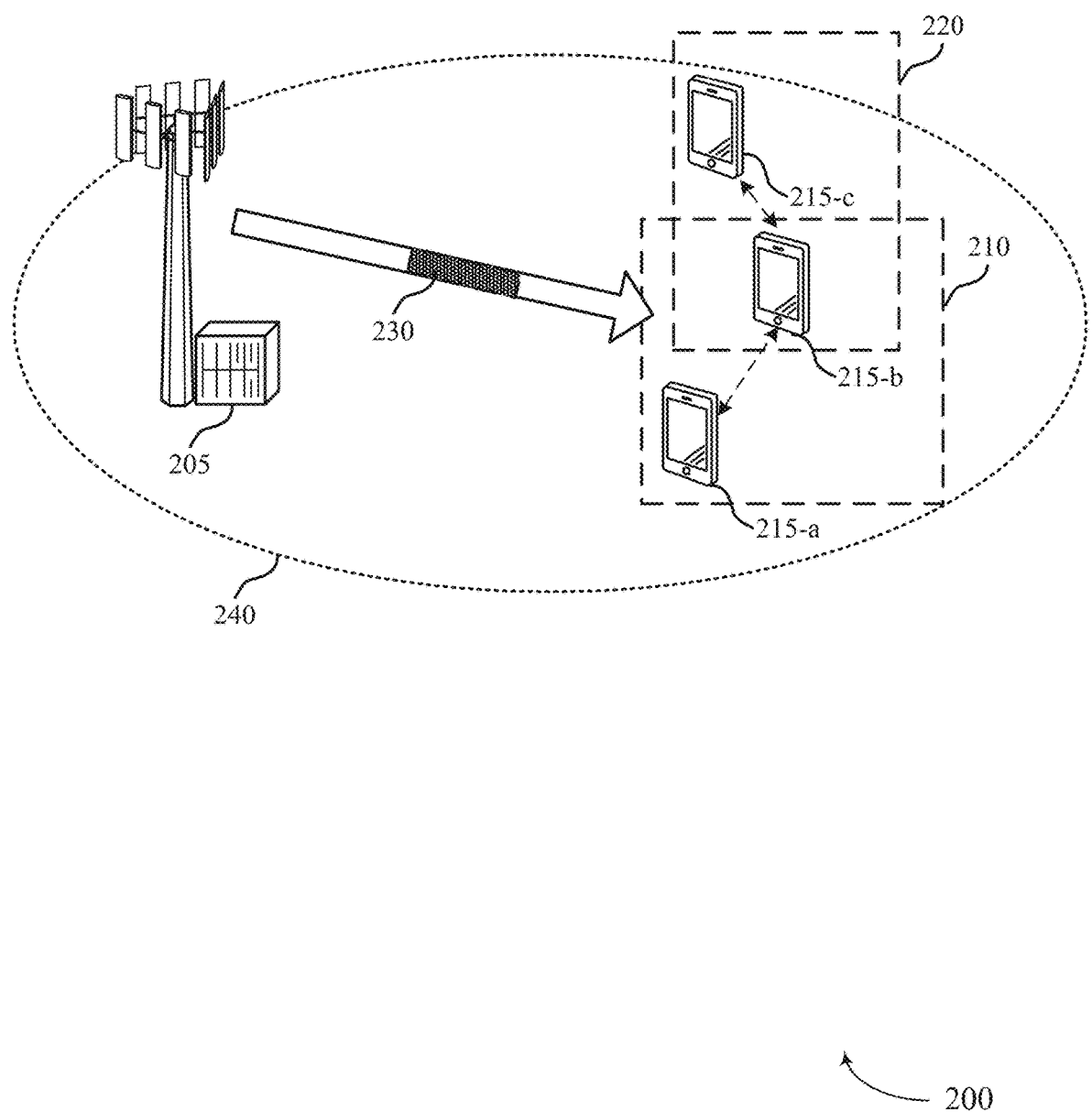

FIG. 2 illustrates an example of a wireless communications system 200 that supports techniques for relaying in sidelink communications in accordance with various aspects of the present disclosure. In some examples, the wireless communications system 200 may implement aspects of wireless communications system 100. The wireless communications system 200 includes base station 205, geographic coverage area 240, and one or more UEs 215 (may also be referred to as devices).

In some cases, the wireless communications system 200 may utilize control signaling to schedule resources for UEs 215 to perform sidelink communications. Additionally or alternatively, the UEs 215 in the wireless communications system 200 may utilize shared information to enhance scheduling, inter-UE coordination, and communications flexibility. In some examples, the group of UEs 215 (e.g., UE 215-a (UE 1), UE 215-b (UE 2), and UE 215-c (UE 3)) may communicate with each other (e.g., within a V2X system, a D2D system, and the like) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 215 (such as, UE 215-a and UE 215-b) and a base station 205. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

Base station 205 may communicate with one or more UEs 215 (e.g., UEs 215-*a*, 215-*b*, and 215-*c*). In some examples, UE 215-*a* and UE 215-*b* may be included within a first UE group 210 having a common coverage area and UE 215-*b* and UE 215-*c* may be included within a second UE group 220 having a common coverage area. In some instances, base station 205 may transmit control information to UE 215-*a*, UE 215-*b*, or UE 215-*c*. As depicted in the example of FIG. 2, the UE 215-*a*, the UE 215-*b*, and the UE 215-*c* may communicate with each other (or with another group of UEs 215) over sidelink communications (e.g., using a peer-to-peer (P2P) or D2D protocol). In some cases, the UE 215-*a* may transmit sidelink transmissions to the UE 215-*b*. Additionally or alternatively, the UE 215-*b* may transmit sidelink transmission to the UE 215-*c*. Although not depicted in the example of FIG. 2, it may be understood that the UE 215-*a* may transmit sidelink transmissions to the UE 215-*c*. In some examples, UE 215-*a* or UE 215-*b* may monitor resource pools for the sidelink communications or indications of the sidelink communications (e.g., resource reservations, control channel transmissions, among other examples) from other UEs 215 in the group. Additionally or alternatively, the UEs 215 may have data to transmit to (or receive from) one or more of the UEs 215 in the group and may use the sidelink communications to transmit the data transmission. In some examples, the group of UEs 215 may utilize sidelinks communications in addition to access links with the base station 205.

In some examples, sidelink communications may support communications within a group of UEs 215 (e.g., group 210 or group 220). For instance, sidelink communications may include communications between a UE (such as, UE 215-*a*, UE 215-*b*, and UE 215-*c*) and other UEs 215 within a coverage area including the group of UEs (e.g., a coverage area provided by a base station, a coverage area outside of the coverage area provided by the base station, or a combination thereof). One or more of the UEs 215 in a group of UEs 215 may initiate sidelink communications with other UEs in the group of UEs. For example, one or more of the UEs 215 may be in a coverage area 240 (e.g., a coverage area 110 with reference to FIG. 1) of the base station 205. In such examples, a UE 215 may communicate with the base station 205 via a Uu interface (e.g., the base station 205 may transmit downlink communications to one or more of the UEs 215 via an access link). In some other examples, the group of UEs 215 may not be inside the coverage area or may not communicate with the base station 205 using an access link.

In some cases, a UE 215 (such as, UE 215-*a*, UE 215-*b*, and UE 215-*c*) may have information (e.g., a detection of an object or obstacle on a road in a V2X system, scheduling information, among other examples) to transmit to the group of UEs 215, and the UE 215 may initiate sidelink communications including the information to the other UEs 215. In such cases, the UE 215 initiating the sidelink communications may be referred to as a transmitter UE and the UE 215 receiving the sidelink communications may be referred to as a receiving UE. In some examples, the base station 205 may configure sidelink communication resources for the group of UEs using a configuration message (e.g., semi-persistent scheduling configuration message). In one example, the base station 205 may communicate a control signaling 230 indicating a resource allocation for one or more UEs included in the group of UEs.

In some wireless communications systems, a UE from the group of UEs may be allowed to select sidelink transmission resources. In some examples, NR V2X communication may support two modes of resource allocation mechanism: Mode 1 (where the resource is scheduled by a base station) and Mode 2 (where the UE performs an autonomous resource selection). In case of Mode 2 operation, each transmitter UE may perform a sensing operation to find occupied or available resources for transmission. For example, devices (receivers and transmitters) may perform a sensing operation before transmitting.

In some sidelink communications systems, one or more UEs 215 may select resources to transmit using a sensing mechanism. In some examples, a UE 215-*a* may select vacant resources to prevent collisions with other transmissions. The process for selecting resources includes power estimation (received signal strength indicator measurements), excluding unmeasured subframes (e.g. due to previous transmissions), and excluding resources based on an expected conflict with other UE's transmissions. In some wireless communications systems supporting sidelink communications, the resource allocation is not controlled by a base station. A transmitter UE may determine vacant resources based on sensing resources reserved by UEs within the coverage area of the transmitter UE. However, hidden UEs may be unaware of a neighboring UE which may result in collision of transmissions. Additionally, coverage of UEs in sidelink communications systems may be limited by UEs' transmit power (which may be lower than transmit power of a base station). In some examples, a relay UE may be used to handle upcoming collisions and increase coverage.

A relay UE may be a device that receives information and relays that information to increase communication efficiency (e.g., coverage). As depicted in the example of FIG. 2, the UE 215-*a* and the UE 215-*b* are included in a coverage area, and the UE 215-*b* and the UE 215-*c* are included in a different coverage area. In this example, the UE 215-*a* may be a transmitter UE transmitting an initial transmission and the UE 215-*b* may be a relay UE configured to relay the transmission (or transit an echo of the transmission) received from the UE 215-*a*. Because, the UE 215-*b* and the UE 215-*c* are included in a common coverage area, relaying the transmission received from the UE 215-*a* will enable the UE 215-*c* to be aware of transmissions from a UE located outside its coverage area. In some examples, relaying may help increasing a coverage area of a transmitter UE (i.e., UE 215-*c* may be aware of UE 215-*a*'s transmission even if it is located outside the coverage area of the UE 215-*a*). For instance, increasing coverage area may be desired in a congested scenario (e.g., to improve packet error rate and information age). In some wireless communications systems, relay may be performed consuming additional resources. A first set of resources may be consumed by the transmitter UE (e.g., UE 215-*a*) to transmit the initial transmission and a second set of resources may be consumed by the relay UE (e.g., UE 215-*b*) in relaying the transmissions. In sidelink communication systems, resources may be limited. Thus, it may be desirable for the relay UE to implement updated methods of relaying for efficient utilization of resources in wireless communications systems supporting sidelink communications.

According to one or more aspects of the present disclosure, a relay UE may be configured to echo or relay a control channel and a shared channel during a set of resources allocated for retransmission of the control channel and the shared channel. Utilizing retransmission resources for relaying may increase coverage without additional resource consumption. As depicted in the example of FIG. 2, the UE 215-a is a transmitter UE, the UE 215-b is a relay UE and the UE 215-c is a receiver UE. In some examples, the relay UE (e.g., UE 215-b) may receive, from the transmitter UE (e.g., UE 215-a) and on a first set of resources, a first control information associated with sidelink communication. The relay UE (e.g., UE 215-b) may further receive, from the transmitter UE (e.g., UE 215-a) and on a second set of resources, a first shared channel information associated with the sidelink communication. For example, the relay UE may receive a physical sidelink control channel and a physical sidelink shared channel in a first subframe.

According to one or more aspects, a physical sidelink control channel may follow an uplink shared channel (e.g., physical uplink shared channel) with some adaptations. For example, a bit processing in the physical sidelink control channel may follow a downlink control information with no scrambling in cyclic redundancy check attachment. In some examples, scrambling in physical sidelink control channel may be initialized with a constant (e.g., $c_{init}=510$). Additionally or alternatively, a physical sidelink shared channel may follow an uplink shared channel (e.g., physical uplink shared channel) with some adaptations. In some examples, scrambling in physical sidelink shared channel may be initialized with a constant and may be dependent on the slot and one or more reference signals associated with the physical sidelink control channel. In some examples, the physical sidelink control channel and the physical sidelink shared channel may follow one or more parameters according to Table 1.

TABLE 1

| Parameters | | Physical Sidelink Shared Channel | Physical Sidelink Control Channel |
|---|---|---|---|
| Group hopping | $n_{ID}^{RS}$ | enabled $n_{ID}^{X}$ | disabled — |
| | $n_s$ | $2n_{SS}^{PSSCH}$ first demodulation reference signal (DMRS) symbol in a slot $2n_{SS}^{PSSCH} + 1$ second DMRS symbol in a slot | 8 |
| Sequence hopping | $f_{ss}$ | $n_{ID}^{X}/16]$ mod 30 disabled | disabled |
| Cyclic shift | $n_{cs,\lambda}$ | $[n_{ID}^{X}/2]$ mod 8 | {0, 3, 6, 9} |
| Orthogonal sequence | $[\tilde{W}^\lambda(.)]$ | $[+1\ +1\ +1\ +1]$ if $n_{ID}^{X}$ mod 2 = 0 $[+1\ -1\ +1\ -1]$ if $n_{ID}^{X}$ mod 2 = 1 | $[+1\ +1\ +1\ +1]$ |
| Reference signal length | $M_{SC}^{RS}$ | $M_{SC}^{PSSCH}$ | $M_{SC}^{PSCCH}$ |
| Number of layers | v | 1 | 1 |
| Number of antenna ports | P | 1 | 1 |

As depicted in Table 1, one or more reference signals for a physical sidelink control channel may be associated with no group or sequence hopping and same orthogonal code. In some examples, channel separation for the reference signals may be according to the cyclic shifts. For example, a UE may randomly select one of the four values (e.g., {0,3,6,9}) to determine a cyclic shift associated with a reference signal for a physical sidelink control channel. Additionally or alternatively, one or more reference signals for a physical sidelink shared channel may be associated with no sequence hopping and group hopping based on $n_{ID}^{X}$. In some examples, the one or more reference signals for a physical sidelink shared channel may be associated with orthogonal code and cyclic shifts based on $n_{ID}^{X}$. In some examples, $n_{ID}^{X}$ may be based on a UE may randomly select one of the four values (e.g., {0,3,6,9}) to determine a cyclic redundancy check value (e.g., sidelink control information payload) of a corresponding physical sidelink control channel (e.g., $n_{ID}^{X}=\Sigma_{i=0}^{L-1} p_i \cdot 2^{L-1-i}$).

In some examples, a relay UE may determine information associated with existence and location of transmissions of physical sidelink control channel and physical sidelink shared channel. The relay UE may use sidelink control information received in the sidelink control channel (e.g., physical sidelink control channel) to identify retransmission resources. Additionally or alternatively, upon receiving the first control information, the relay UE (e.g., UE 215-b) may identify retransmission resources based on one or more additional semi-persistently scheduled transmissions (e.g., each transmission indicating a transmission period of 20 or 50 or 100 or 200 . . . 1000 subframes).

In some cases, a receiver UE may identify a feedback for a signal based on one or more redundancy versions (RVs) (e.g., RV0, RV2, etc.) and controls (1 or 2 or . . . 15 subframe gaps). In some examples, the subframe gap may indicate a time (e.g., subframe based) location of a retransmission. In some examples, a source of location of the retransmission may be indicated using a frequency allocation field (e.g., resource indication value (MV)). Additionally or alternatively, a combination of RV0 and subframe gap (e.g., subframe gap>0) may indicate an existence of a retransmission. In some wireless communications systems, cyclic shifts for RV0 and RV2 may be randomly selected. In some examples, a same cyclic shift (as the one randomly selected for RV0) may be used for both RV0 and RV2. In some examples, the cyclic shift may be indicated via a notification bit in sidelink control information. In some examples, RV0 and RV2 may use different cyclic shifts, where the cyclic shift for RV2 is randomly selected from a subset of cyclic shifts (e.g., subset of cyclic shifts excluding cyclic shift of RV0). In some examples, physical sidelink shared channel scrambling, group hopping, orthogonal code and cyclic shift may be dependent on the sidelink control information of a corresponding physical sidelink control channel. In some examples, a transport block payload may be same across RV0 and RV2. In some cases, RV0 and RV2 may differ according to one or more bits included in corresponding circular buffers.

According to one or more examples, RV0 and RV2 may point to one another and may implicitly indicate sidelink control information associated with a physical sidelink control channel and respective physical sidelink shared channel attributes (e.g., cyclic shift, group hopping, etc.). Additionally or alternatively, RV0 and RV2 may indicate a transport block information associated with the physical sidelink shared channel, circular buffer information, and physical sidelink shared channel RV1 information associated with RV0 and RV2. In some examples, RV0 and RV2 may indicate a cyclic shift associated with the physical sidelink control channel.

According to one or more aspects of the present disclosure, the relay UE (e.g., UE 215-b) may determine that the transmitter UE (e.g., UE 215-a) has reserved a set of resources (in a later subframe) for retransmission of the physical sidelink control channel and the physical sidelink shared channel. For example, the relay UE (e.g., UE 215-*b*) may identify a third set of resources associated with a retransmission of the first control information and a fourth set of resources associated with a retransmission of the first shared channel information. If the relay UE successfully decodes the physical sidelink control channel and the physical sidelink shared channel, then the relay UE may utilize the resources reserved for retransmission to relay the physical sidelink control channel and the physical sidelink shared channel to a hidden UE 215-*c* (e.g., UE located outside the coverage area of the transmitter UE 215-*a*).

In some examples, the relay UE (e.g., UE 215-*b*) may receive a sidelink control channel on the first set of resources and may identify sidelink control information included in the sidelink control channel. The relay UE may determine a gap between the first time period and a second time period allocated by the transmitter UE for the retransmission of the first control information. In some examples, the gap may be based on the sidelink control information. The relay UE may then identify the third set of resources associated with the retransmission of the first control information based on the first set of resources and the determined gap. As described herein, resources may be provided in a two dimensional grid. In time domain, the resources may be provided in terms of time periods (e.g., subframes, slots, shortened transmission time intervals, etc.) and in frequency domain, the resources may be provided in terms of sub-channels (e.g., number of physical resource blocks). The sidelink control information may indicate the location of the resources of the re-transmission by providing a time gap (e.g., subframe-gap) from the current time period (e.g., subframe) in time domain, and a field indicating both start and duration of sub-channels (e.g., RIV field) in frequency domain.

The relay UE may utilize both time domain and frequency domain information from the sidelink control information to identify the resources allocated for retransmissions at the transmitter UE (e.g., UE 215-*a*). Upon identifying the set of resources (both time domain resources and frequency domain resources) allocated for retransmissions by the transmitter UE, the relay UE may utilize those resources to transmit a retransmission of the first control information and a retransmission of the first shared channel information. As described herein, the relay UE may identify a third set of resources associated with a retransmission of the first control information and a fourth set of resources associated with a retransmission of the first shared channel information. The relay UE may transmit, on the third set of resources, a second transmission associated with the first control information. The relay UE may further transmit, on the fourth set of resources, a second transmission associated with the first shared channel information. The transmissions described herein may be broadcast transmissions.

In some examples, the relay UE may transmit RV2 of the physical sidelink shared channel in the reserved resources. The relay UE may recalculate the RV2 from the transport block associated with RV0 of the physical sidelink shared channel. Thus, the transmitter UE may transmit RV0 of the physical sidelink shared channel (as retransmission) in the resources used by the relay UE in transmitting RV2 of the physical sidelink shared channel. The relay UE (e.g., UE 215-*b*) may identify a first set of attributes associated with the first shared channel information (e.g., physical sidelink control channel) based on the sidelink control information, and may identify a second set of attributes associated with the retransmission of the first shared channel information based on the first set of attributes. In some cases, the relay UE (e.g., UE 215-*b*) may determine that the first shared channel information is associated with a RV0 based on the first set of attributes. The relay UE (e.g., UE 215-*b*) may then identify a transport block payload associated with the first shared channel information. In some examples, the relay UE may determine the retransmission of the first shared channel information including the identified transport block payload. That is, the relay UE may retransmit the physical sidelink shared channel having the same transport block payload as the physical sidelink shared channel transmitted by the transmitter UE (e.g., UE 215-*a*). The relay UE then transmits the retransmission of the first shared channel information associated with RV2. As described herein, the first set of attributes and the second set of attributes may include at least one of a physical sidelink shared channel scrambling parameter, a group hopping parameter, an orthogonal code, a cyclic shift, or any combination thereof. In some examples, a number of bits included in a circular buffer associated with the RV0 may be different from a number of bits included in a circular buffer associated with RV2.

Additionally or alternatively, the relay UE may determine that the first control information is associated with RV0. That is, the sidelink control information associated with the physical sidelink control channel may be associated with RV0. The relay UE may then retransmit the first control information associated with RV2. In some examples, a first cyclic shift associated with RV0 and a second cyclic shift associated with RV2 may be randomly selected. In some examples, RV0 and RV2 may be associated with the same cyclic shift. Additionally or alternatively, a first cyclic shift associated with RV0 may be different from a second cyclic shift associated with RV2. For example, RV0 may have a first cyclic shift of 3 and RV2 may have a second cyclic shift of 6. In some examples, RV0 may have a first cyclic shift of 3 and a second cyclic shift for RV2 may be randomly selected from a set of cyclic shifts (e.g., {0, 6, 9}). In some examples, the relay UE may include a bit in the retransmission of the first control information. In some cases, a value of the bit indicates that the transmission on the third set of resources is an echo of the first control information. For instance, the relay UE may include 1 bit indicating that the transmission is an echoed transmission.

According to one or more aspects, a relay UE may be configured to support V2X sidelink communication and may be configured to support transmission of physical sidelink control channel or physical sidelink shared channel on one preconfigured frequency. In some examples, the relay UE may include a capability to transmit echo of a transmission. In some examples, the capability may be based on a number of previous transmissions in a subframe, an amount of gap supported by the first UE, or a combination thereof.

The relay UE (e.g., UE 215-*b*) may thus utilize resources reserved for retransmission by a transmitter UE (e.g., UE 215-*a*) to relay control channel and shared channel to a receiver UE (e.g., UE 215-*c*) located outside the coverage area of the transmitter UE. In some cases, if a third UE (not shown) located within the coverage area of the transmitter UE receives RV0 of the physical sidelink shared channel (from the transmitter UE) and RV2 of the physical sidelink shared channel from the relay UE, then the third UE may perform combining mechanism to decode the physical sidelink shared channel. Thus, the one or more aspects of the present disclosure provide for a no-cost relaying mechanism performed on pre-occupied resources.

Figure 3:
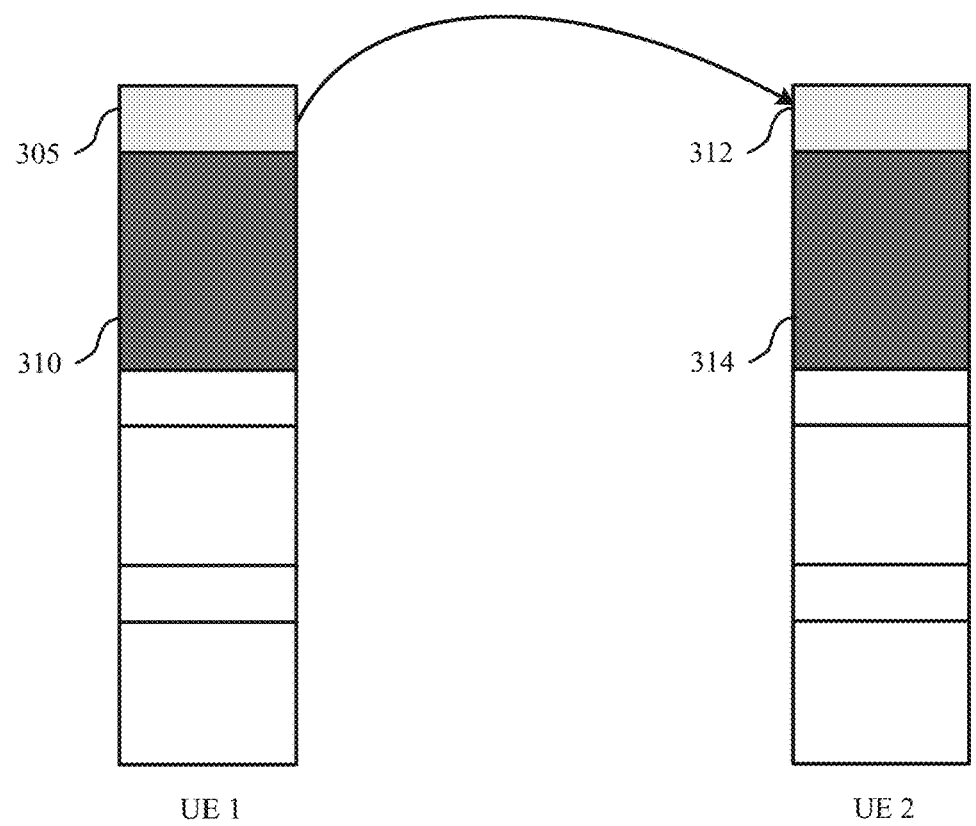
FIGS. 3 and 4 illustrate examples of process flows that support techniques for relaying in sidelink communications in accordance with various aspects of the present disclosure.
Figure 3:
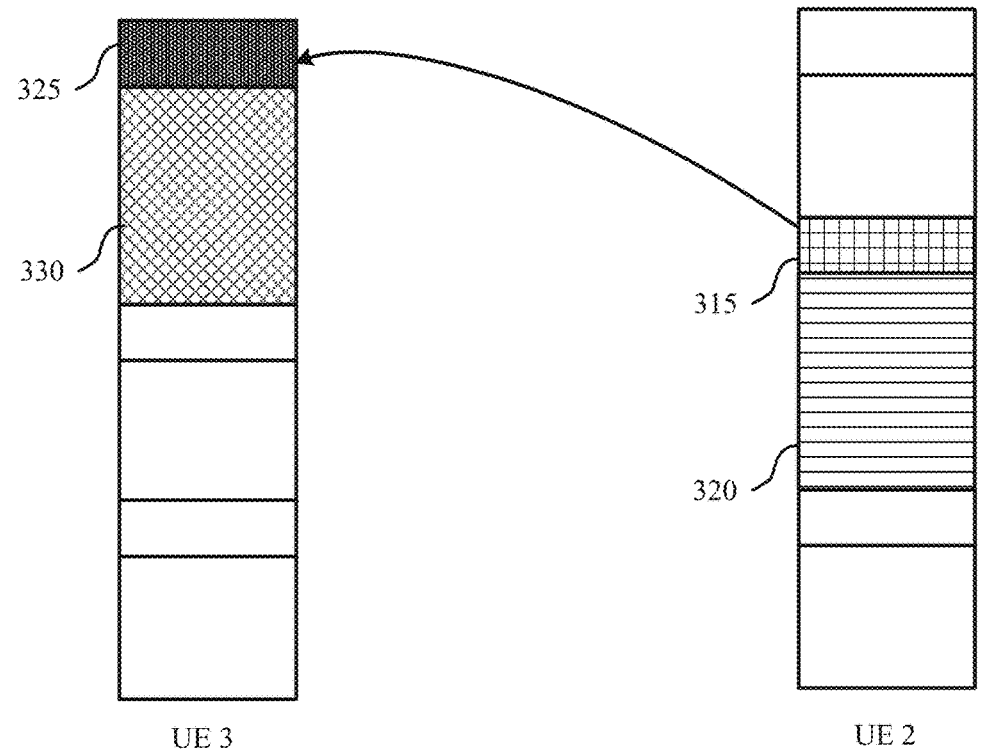

FIG. 3 illustrates an example of a process flow 300 that supports techniques for relaying in sidelink communications in accordance with various aspects of the present disclosure. In some examples, the process flow 300 may implement aspects of wireless communications system 100 and the wireless communications system 200 described with reference to FIGS. 1 and 2, respectively. For example, the process flow 300 may be based on one or more rules for relaying in sidelink communication. The process flow 300 may be implemented by the UE 1, UE 2 and UE 3 for reduced power consumption, and may promote low latency and low interference for wireless communications supporting high priority channels, among other benefits. UE 1, UE 2, and UE 3 may be examples of a UE 215, as described with reference to FIGS. 1 and 2.

In the example of FIG. 3, UE 1 may be a transmitter UE, UE 2 may be a relay UE, and UE 3 may be a receiver UE. UE 1 and UE 2 may be included in a first coverage area and the UE 2 and UE 3 may be included in a second coverage area. In some examples, the UE 2 may be a half-duplex UE. That is, the UE 2 may receive a transmission from UE 1 during a first time period (e.g., time slot) and the UE 2 may utilize a second time period to relay the transmission to UE 3. In some examples, the UE 2 may be a full-duplex UE. That is, the UE 2 may be capable of simultaneously receiving and transmitting during a same time period.

At 305, the UE 1 may transmit a first control information associated with sidelink communication on a first set of resources. The first set of resources may include a first set of time resources (e.g., subframe) and a first set frequency resources (e.g., subchannel). The first control information associated with sidelink communication may include a sidelink control information. In some examples, the first control information may include a physical sidelink control channel. At 305, the UE 1 may transmit RV0 associated with the physical sidelink control channel.

At 310, the UE 1 may transmit a first shared channel information associated with sidelink communication on a second set of resources. The second set of resources may include a second set of time resources (e.g., subframe) and a second set frequency resources (e.g., subchannel). In some examples, the first shared channel information may include a physical sidelink shared channel. The UE 1 may transmit RV0 associated with the physical sidelink shared channel.

At 312, the UE 2 may receive the first control information associated with sidelink communication on the first set of resources. As depicted herein, the first set of resources may include the first set of time resources (e.g., subframe) and the first set frequency resources (e.g., subchannel). In some examples, the UE 2 may receive the RV0 associated with the physical sidelink control channel. The UE 2 may receive the first control information and may identify a third set of resources associated with a retransmission of the first control information.

At 314, the UE 2 may receive the first shared channel information associated with sidelink communication on the second set of resources. In some examples, the UE 2 may identify the second set of resources based on the RV0 associated with the physical sidelink control channel (e.g., sidelink control information). The UE 2 may receive the first shared channel information and may identify a fourth set of resources associated with a retransmission of the first shared channel information. As depicted herein, the UE 2 may be a receiver at 312 and 314.

At 315, the UE 2 may transmit, on the third set of resources, the retransmission of the first control information. The UE 2 may transmit RV2 associated with the physical sidelink control channel on the third set of resources. Although not shown in FIG. 3, it may be understood that the UE 1 may retransmit the physical sidelink control channel on the third set of resources.

At 320, the UE 2 may transmit, on the fourth set of resources, the retransmission of the first shared channel information. The UE 2 may transmit RV2 associated with the physical sidelink shared channel on the fourth set of resources. Although not shown in FIG. 3, it may be understood that the UE 1 may retransmit the physical sidelink shared channel on the fourth set of resources. As depicted herein, the UE 2 may be a transmitter at 315 and 320.

At 325, the UE 3 may receive the RV2 associated with the physical sidelink control channel on the third set of resources and at 330, the UE 3 may receive the RV2 associated with the physical sidelink shared channel on the fourth set of resources. Upon receiving the RV2 associated with the physical sidelink control channel and the RV2 associated with the physical sidelink shared channel, the UE 3 may be aware of UE 1's RV0 and RV2 resources. In some examples, the UE 3 may apply one or more reception enhancements (e.g., combining with same or different cyclic shifts) upon receiving the transmissions from the UE 2.

Figure 4:
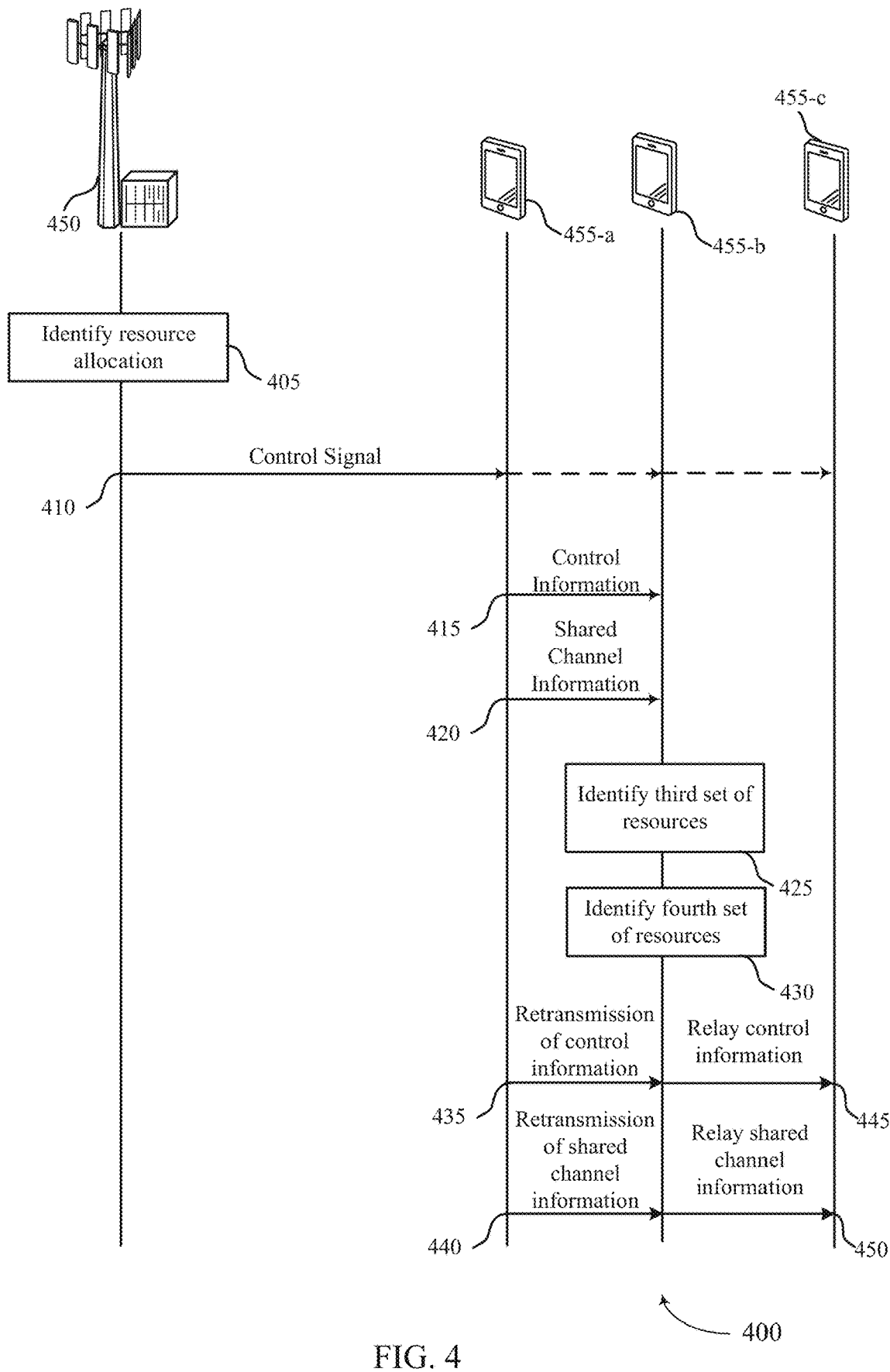

FIG. 4 illustrates an example of a process flow 400 that supports techniques for relaying in sidelink communications in accordance with various aspects of the present disclosure. In some examples, the process flow 400 may implement aspects of wireless communications system 100 and the wireless communications system 200 described with reference to FIGS. 1 and 2, respectively. For example, the process flow 400 may be based on methods to relay using pre-occupied resources in sidelink communication. The process flow 400 may be implemented by the UE 455-a (transmitter UE), the UE 455-b (relay UE), the UE 455-c (receiver UE), and the base station 450 for reduced power consumption, and may promote low latency and low interference for wireless communications supporting high priority channels, among other benefits. The base station 450, the UE 455-a, the UE 455-b, and the UE 455-c may be examples of a base station 105 and a UE 115, as described with reference to FIGS. 1 and 2.

In the following description of the process flow 400, the operations between the base station 450, the UE 455-a, the UE 455-b, and the UE 455-c may be transmitted in a different order than the example order shown, or the operations performed by the base station 450, the UE 455-a, the UE 455-b, and the UE 455-c may be performed in different orders or at different times. Some operations may also be omitted from the process flow 400, and other operations may be added to the process flow 400.

At 405, the base station 450 may identify a resource allocation for sidelink communications for the UE 455-a. Additionally or alternatively, the base station 450 may identify a resource allocation for sidelink communications for the UE 455-b and the UE 455-c. In some examples, the configuration may be for resource allocation for a sidelink channel.

At 410, the base station 450 may transmit, to the UE 455-a (e.g., transmitter UE), a configuration indicating the resource allocation for the sidelink channel. In some examples, the configuration may indicate a set of resources to be used by the transmitter UE for sidelink communication. In some cases, the base station 450 may optionally transmit a configuration (same or different) to the UE 455-b (e.g., relay UE) and the UE 455-c (receiver UE).

At 415, the UE 455-a (or transmitter UE) may transmit, on a first set of resources, a first control information associated with sidelink communication. In some examples, the first control information may include a physical sidelink control channel. Additionally or alternatively, the UE 455-a may transmit a sidelink control information in the first control information. In some examples, the UE 455-*a* may transmit RV0 associated with the physical sidelink control channel on the first set of resources.

At 420, the UE 455-*a* (or transmitter UE) may transmit, on a second set of resources, a first shared channel information associated with sidelink communication. In some examples, the first shared channel information may include a physical sidelink shared channel. In some examples, the UE 455-*a* may transmit RV0 associated with the physical sidelink shared channel on the second set of resources.

At 425, the UE 455-*b* (or relay UE) may identify a third set of resources associated with a retransmission of the first control information. For example, the UE 455-*b* may determine a gap between a first time period during which the sidelink control channel was received, and a second time period allocated by the UE 455-*a* for the retransmission of the first control information. The UE 455-*b* may identify the third set of resources associated with the retransmission of the first control information based on the first set of resources and the determined gap. For example, the UE 455-*b* (or relay UE) may identify resources allocated for the UE 455-*a* for retransmitting the physical sidelink control channel, and the UE 455-*b* may identify resources for relaying the first control information based on the pre-allocated resources.

At 425, the UE 455-*b* (or relay UE) may identify a fourth set of resources associated with a retransmission of the first shared channel information. In some examples, the UE 455-*b* (or relay UE) may identify resources allocated for the UE 455-*a* for retransmitting the physical sidelink shared channel, and the UE 455-*b* may identify resources for relaying the first shared channel information based on the pre-allocated resources.

At 435, the UE 455-*a* may retransmit the first control information and at 440, the UE 455-*a* may retransmit the first shared channel information. Although not depicted in the example of FIG. 4, the UE 455-*a* may send the retransmissions to another UE (other than UE 455-*b*) within the coverage area of the UE 455-*a*.

At 445, the UE 455-*b* (or relay UE) may relay, on the third set of resources, a transmission associated with the first control information. In some examples, the UE 455-*b* may transmit RV2 associated with the first control information. At 450, the UE 455-*b* (or relay UE) may relay, on the fourth set of resources, a transmission associated with the first shared channel information. In some examples, the UE 455-*b* may transmit RV2 associated with the first shared channel information.

Figure 5:
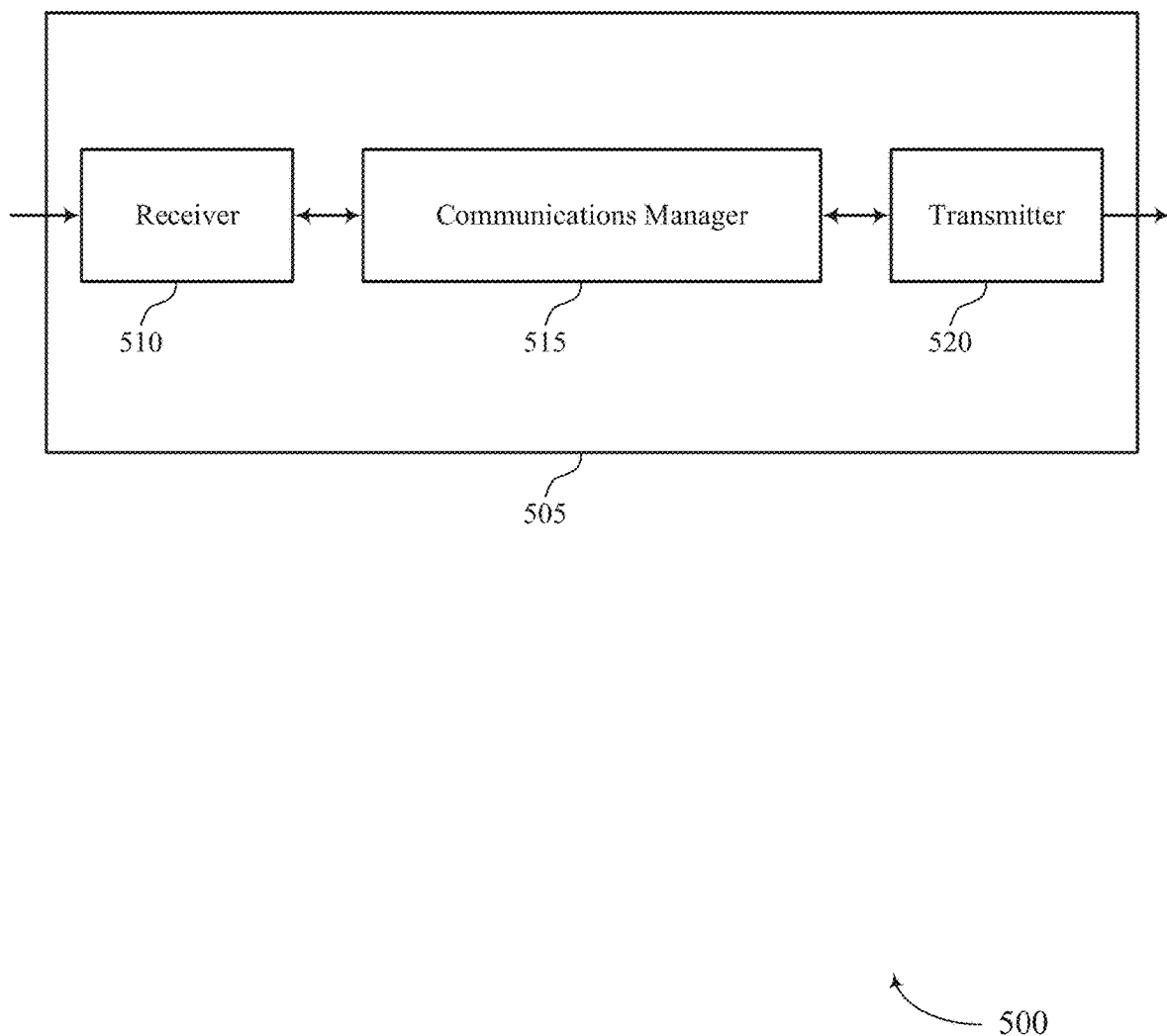
FIGS. 5 and 6 show block diagrams of devices that support techniques for relaying in sidelink communications in accordance with various aspects of the present disclosure.

FIG. 5 shows a block diagram 500 of a device 505 that supports techniques for relaying in sidelink communications in accordance with various aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for relaying in sidelink communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a second UE and on a first set of resources, a first control information associated with sidelink communication, receive, from the second UE and on a second set of resources, a first shared channel information associated with the sidelink communication, identify a third set of resources associated with a retransmission of the first control information and a fourth set of resources associated with a retransmission of the first shared channel information, transmit, on the third set of resources, the retransmission of the first control information, and transmit, on the fourth set of resources, the retransmission of the first shared channel information. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
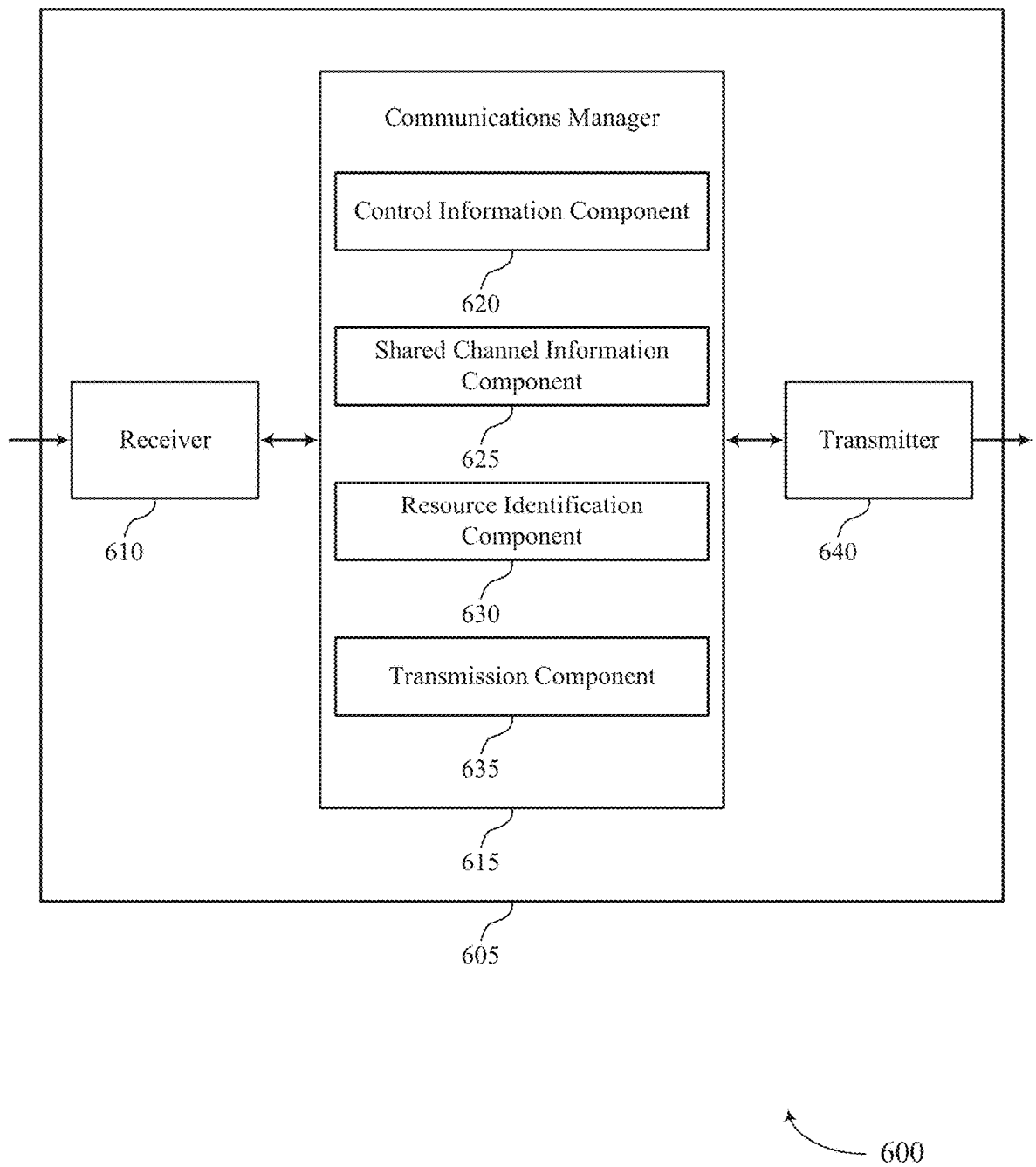

FIG. 6 shows a block diagram 600 of a device 605 that supports techniques for relaying in sidelink communications in accordance with various aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for relaying in sidelink communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control information component 620, a shared channel information component 625, a resource identification component 630, and a transmission component 635. The communications manager 615 may be an example of aspects of the communications manager 810 described herein.

The control information component 620 may receive, from a second UE and on a first set of resources, a first control information associated with sidelink communication. The shared channel information component 625 may receive, from the second UE and on a second set of resources, a first shared channel information associated with the sidelink communication. The resource identification component 630 may identify a third set of resources associated with a retransmission of the first control information and a fourth set of resources associated with a retransmission of the first shared channel information. The transmission component 635 may transmit, on the third set of resources, the retransmission of the first control information and transmit, on the fourth set of resources, the retransmission of the first shared channel information.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
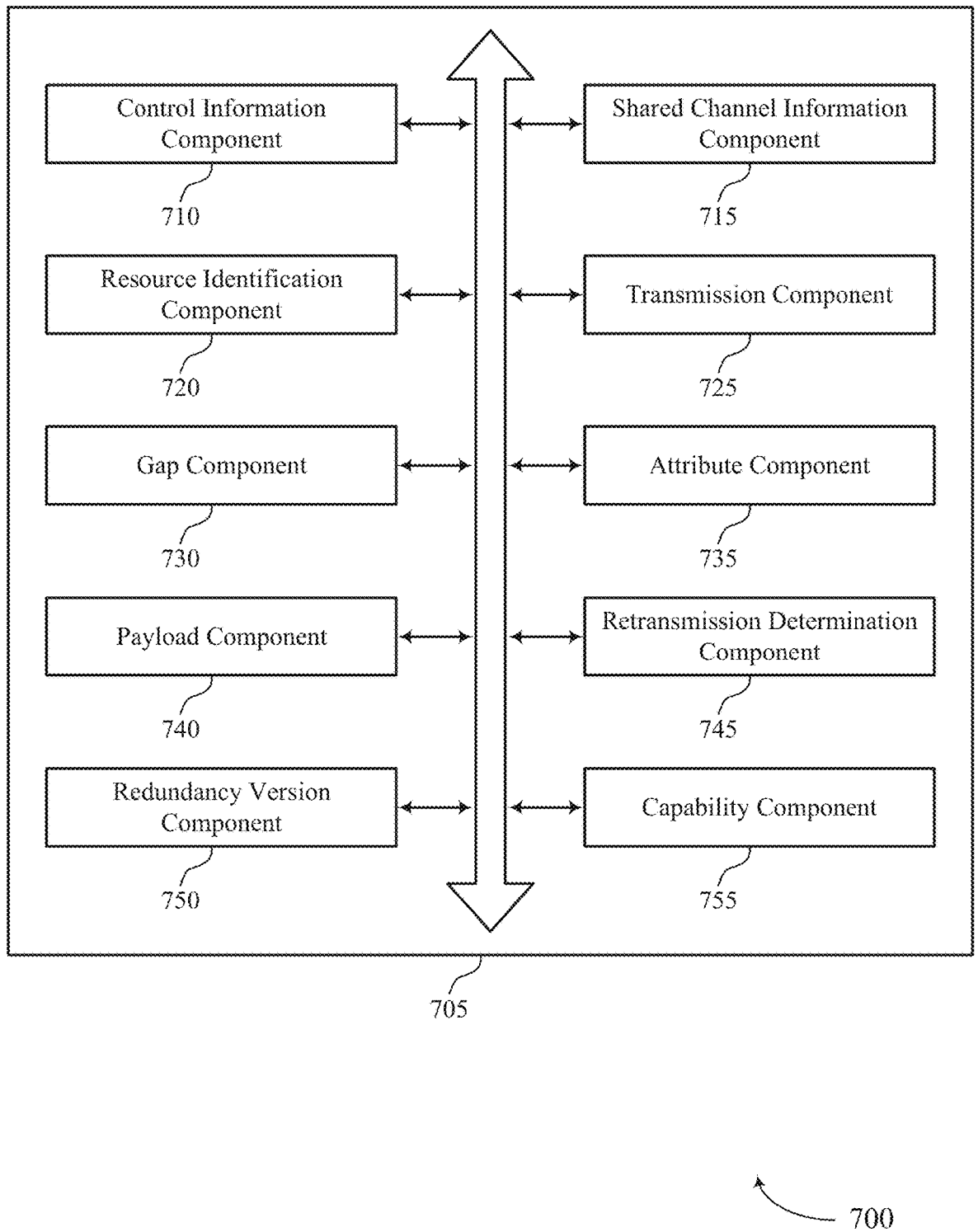
FIG. 7 shows a block diagram of a communications manager that supports techniques for relaying in sidelink communications in accordance with various aspects of the present disclosure.

FIG. 7 shows a block diagram 700 of a communications manager 705 that supports techniques for relaying in sidelink communications in accordance with various aspects of the present disclosure. The communications manager 705 may be an example of aspects of a communications manager 515, a communications manager 615, or a communications manager 810 described herein. The communications manager 705 may include a control information component 710, a shared channel information component 715, a resource identification component 720, a transmission component 725, a gap component 730, an attribute component 735, a payload component 740, a retransmission determination component 745, a redundancy version component 750, and a capability component 755. Each of these components may communicate, directly or indirectly, with one another (e.g., via one or more buses).

The control information component 710 may receive, from a second UE and on a first set of resources, a first control information associated with sidelink communication. In some cases, the first UE and the second UE are included in a first coverage area and the second UE and a third UE are included in a second coverage area. The shared channel information component 715 may receive, from the second UE and on a second set of resources, a first shared channel information associated with the sidelink communication. In some cases, the first control information includes a physical sidelink control channel and the first shared channel information includes a physical sidelink shared channel.

The resource identification component 720 may identify a third set of resources associated with a retransmission of the first control information and a fourth set of resources associated with a retransmission of the first shared channel information. The transmission component 725 may transmit, on the third set of resources, the retransmission of the first control information. In some examples, the transmission component 725 may transmit, on the fourth set of resources, the retransmission of the first shared channel information. In some examples, the control information component 710 may identify sidelink control information included in a sidelink control channel, where receiving the first control information includes receiving the sidelink control channel on the first set of resources and during a first time period. The gap component 730 may determine, based on the sidelink control information, a gap between the first time period and a second time period allocated by the second UE for the retransmission of the first control information. In some examples, the resource identification component 720 may identify the third set of resources associated with the retransmission of the first control information based on the first set of resources and the determined gap. In some examples, the transmission component 725 may transmit an indication of the sidelink control information in the retransmission of the first control information.

The attribute component 735 may identify a first set of attributes associated with the first shared channel information based on the sidelink control information. In some examples, the attribute component 735 may identify a second set of attributes associated with the retransmission of the first shared channel information based on the first set of attributes. In some examples, the attribute component 735 may determine that the first shared channel information is associated with a first redundancy version based on the first set of attributes. The payload component 740 may identify a transport block payload associated with the first shared channel information. The retransmission determination component 745 may determine the retransmission of the first shared channel information including the identified transport block payload, where transmitting the retransmission of the first shared channel information includes transmitting the retransmission of the first shared channel information associated with a second redundancy version. In some cases, a number of bits included in a circular buffer associated with the first redundancy version is different from a number of bits included in a circular buffer associated with the second redundancy version. In some cases, the first set of attributes and the second set of attributes include at least one of a physical sidelink shared channel scrambling parameter, a group hopping parameter, an orthogonal code, a cyclic shift, or any combination thereof.

The retransmission determination component 745 may include a bit in the retransmission of the first control information, where a value of the bit indicates that the transmission on the third set of resources is an echo of the first control information. The redundancy version component 750 may determine that the first control information is associated with a first redundancy version, where transmitting the retransmission of the first control information includes transmitting the retransmission of the first control information associated with a second redundancy version. In some cases, a first cyclic shift associated with the first redundancy version and a second cyclic shift associated with the second redundancy version are randomly selected. In some cases, the first redundancy version and the second redundancy version are associated with the same cyclic shift. In some cases, a first cyclic shift associated with the first redundancy version is different from a second cyclic shift associated with the second redundancy version. The capability component 755 may identify a capability associated with the first UE. In some cases, the first UE includes a capability to transmit echo of a transmission. In some cases, the capability is based on a number of previous transmissions in a subframe, an amount of gap supported by the first UE, or a combination thereof.

Figure 8:
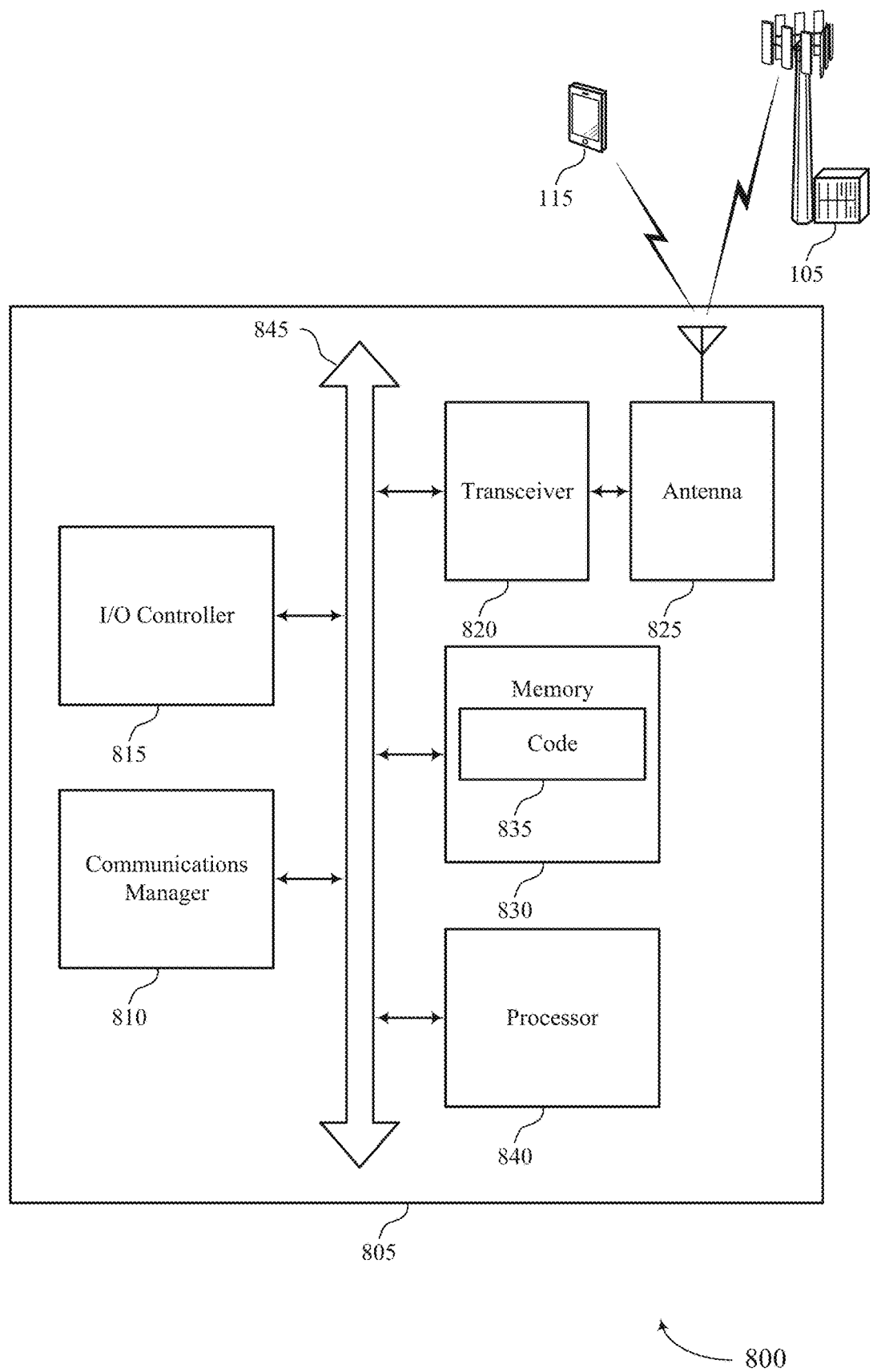
FIG. 8 shows a diagram of a system including a device that supports techniques for relaying in sidelink communications in accordance with various aspects of the present disclosure.

FIG. 8 shows a diagram of a system 800 including a device 805 that supports techniques for relaying in sidelink communications in accordance with various aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a second UE and on a first set of resources, a first control information associated with sidelink communication, receive, from the second UE and on a second set of resources, a first shared channel information associated with the sidelink communication, identify a third set of resources associated with a retransmission of the first control information and a fourth set of resources associated with a retransmission of the first shared channel information, transmit, on the third set of resources, the retransmission of the first control information, and transmit, on the fourth set of resources, the retransmission of the first shared channel information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for relaying in sidelink communications).

Figure 9:
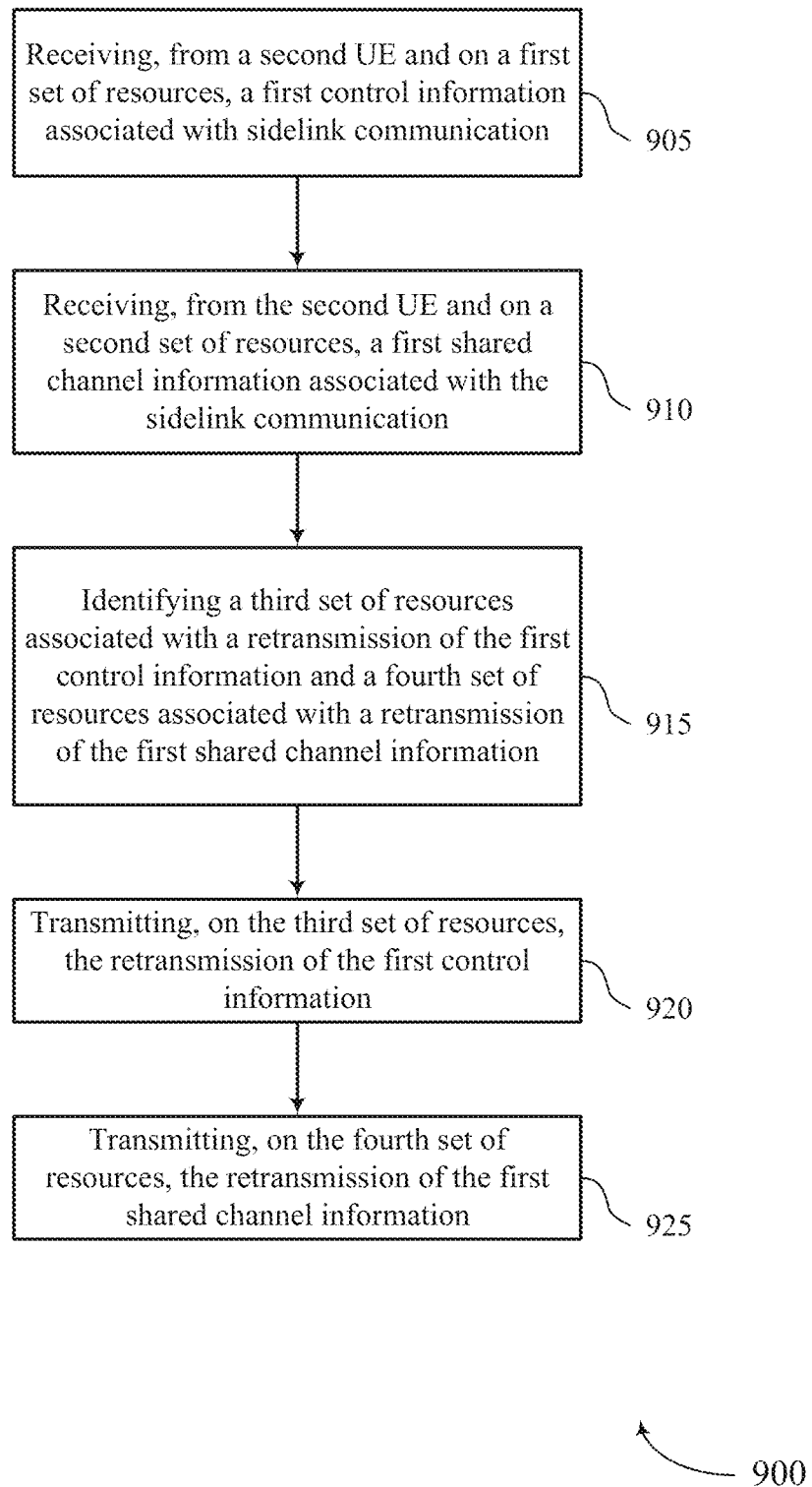
FIGS. 9 through 11 show flowcharts illustrating methods that support techniques for relaying in sidelink communications in accordance with various aspects of the present disclosure.

FIG. 9 shows a flowchart illustrating a method 900 that supports techniques for relaying in sidelink communications in accordance with various aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, from a second UE and on a first set of resources, a first control information associated with sidelink communication. The operations of 905 may be performed according to the methods described herein. In some examples, aspects of the operations of 905 may be performed by a control information component as described with reference to FIGS. 5 through 8.

At 910, the UE may receive, from the second UE and on a second set of resources, a first shared channel information associated with the sidelink communication. The operations of 910 may be performed according to the methods described herein. In some examples, aspects of the operations of 910 may be performed by a shared channel information component as described with reference to FIGS. 5 through 8.

At 915, the UE may identify a third set of resources associated with a retransmission of the first control information and a fourth set of resources associated with a retransmission of the first shared channel information. In some examples, the UE may identify the fourth set of resources based on the first control information. The operations of 915 may be performed according to the methods described herein. In some examples, aspects of the operations of 915 may be performed by a resource identification component as described with reference to FIGS. 5 through 8.

At 920, the UE may transmit, on the third set of resources, the retransmission of the first control information. The operations of 920 may be performed according to the methods described herein. In some examples, aspects of the operations of 920 may be performed by a transmission component as described with reference to FIGS. 5 through 8.

At 925, the UE may transmit, on the fourth set of resources, the retransmission of the first shared channel information. The operations of 925 may be performed according to the methods described herein. In some examples, aspects of the operations of 925 may be performed by a transmission component as described with reference to FIGS. 5 through 8.

Figure 10:
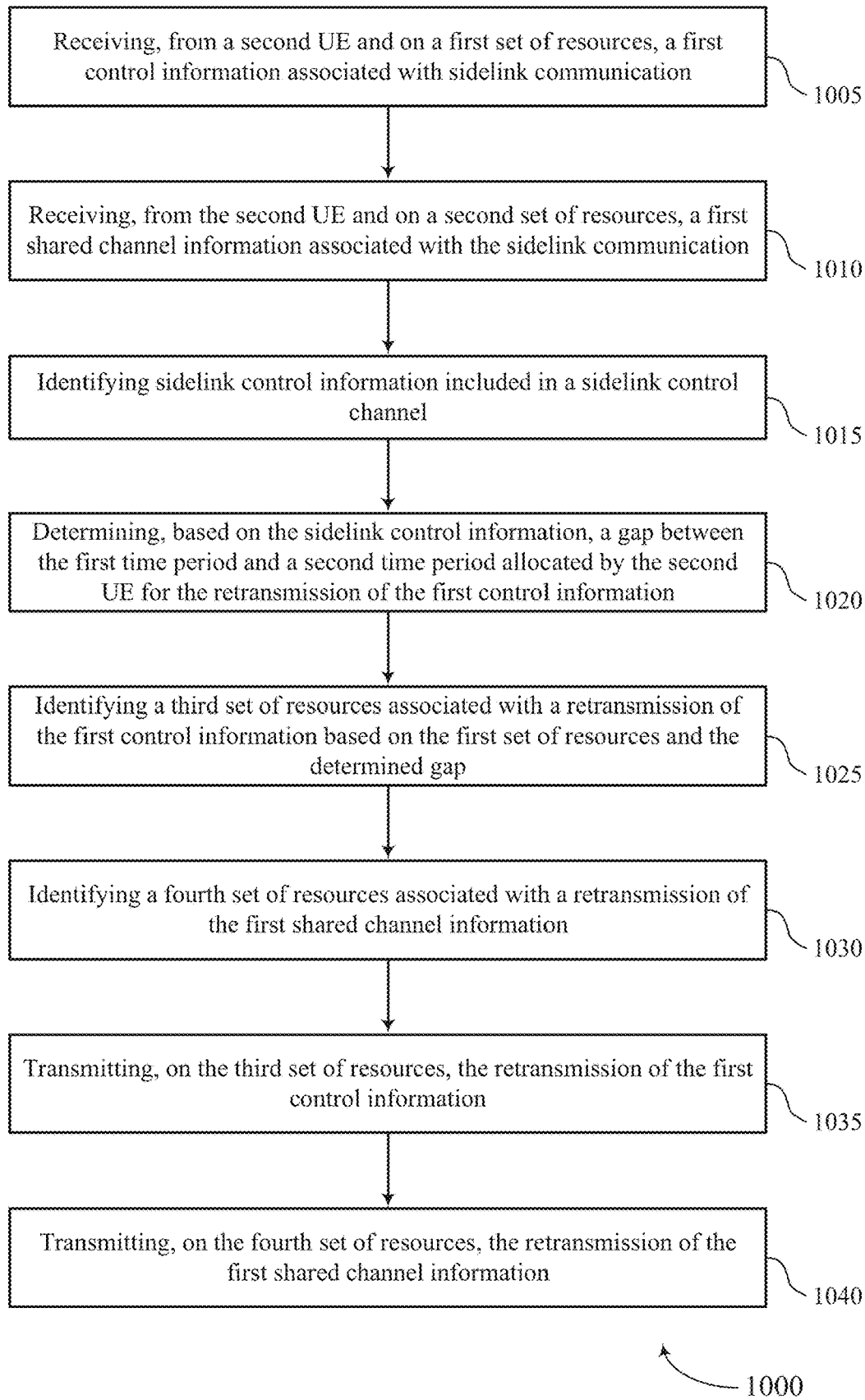

FIG. 10 shows a flowchart illustrating a method 1000 that supports techniques for relaying in sidelink communications in accordance with various aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, from a second UE and on a first set of resources, a first control information associated with sidelink communication. The operations of 1005 may be performed according to the methods described herein. In some examples, aspects of the operations of 1005 may be performed by a control information component as described with reference to FIGS. 5 through 8.

At 1010, the UE may receive, from the second UE and on a second set of resources, a first shared channel information associated with the sidelink communication. The operations of 1010 may be performed according to the methods described herein. In some examples, aspects of the operations of 1010 may be performed by a shared channel information component as described with reference to FIGS. 5 through 8.

At 1015, the UE may identify sidelink control information included in a sidelink control channel. In some cases, receiving the first control information includes receiving the sidelink control channel on the first set of resources and during a first time period. The operations of 1015 may be performed according to the methods described herein. In some examples, aspects of the operations of 1015 may be performed by a control information component as described with reference to FIGS. 5 through 8.

At 1020, the UE may determine, based on the sidelink control information, a gap between the first time period and a second time period allocated by the second UE for the retransmission of the first control information. The operations of 1020 may be performed according to the methods described herein. In some examples, aspects of the operations of 1020 may be performed by a gap component as described with reference to FIGS. 5 through 8.

At 1025, the UE may identify a third set of resources associated with a retransmission of the first control information based on the first set of resources and the determined gap. The operations of 1025 may be performed according to the methods described herein. In some examples, aspects of the operations of 1025 may be performed by a resource identification component as described with reference to FIGS. 5 through 8.

At 1030, the UE may identify a fourth set of resources associated with a retransmission of the first shared channel information. The operations of 1030 may be performed according to the methods described herein. In some examples, aspects of the operations of 1030 may be performed by a resource identification component as described with reference to FIGS. 5 through 8.

At 1035, the UE may transmit, on the third set of resources, the retransmission of the first control information. The operations of 1035 may be performed according to the methods described herein. In some examples, aspects of the operations of 1035 may be performed by a transmission component as described with reference to FIGS. 5 through 8.

At 1040, the UE may transmit, on the fourth set of resources, the retransmission of the first shared channel information. The operations of 1040 may be performed according to the methods described herein. In some examples, aspects of the operations of 1040 may be performed by a transmission component as described with reference to FIGS. 5 through 8.

Figure 11:
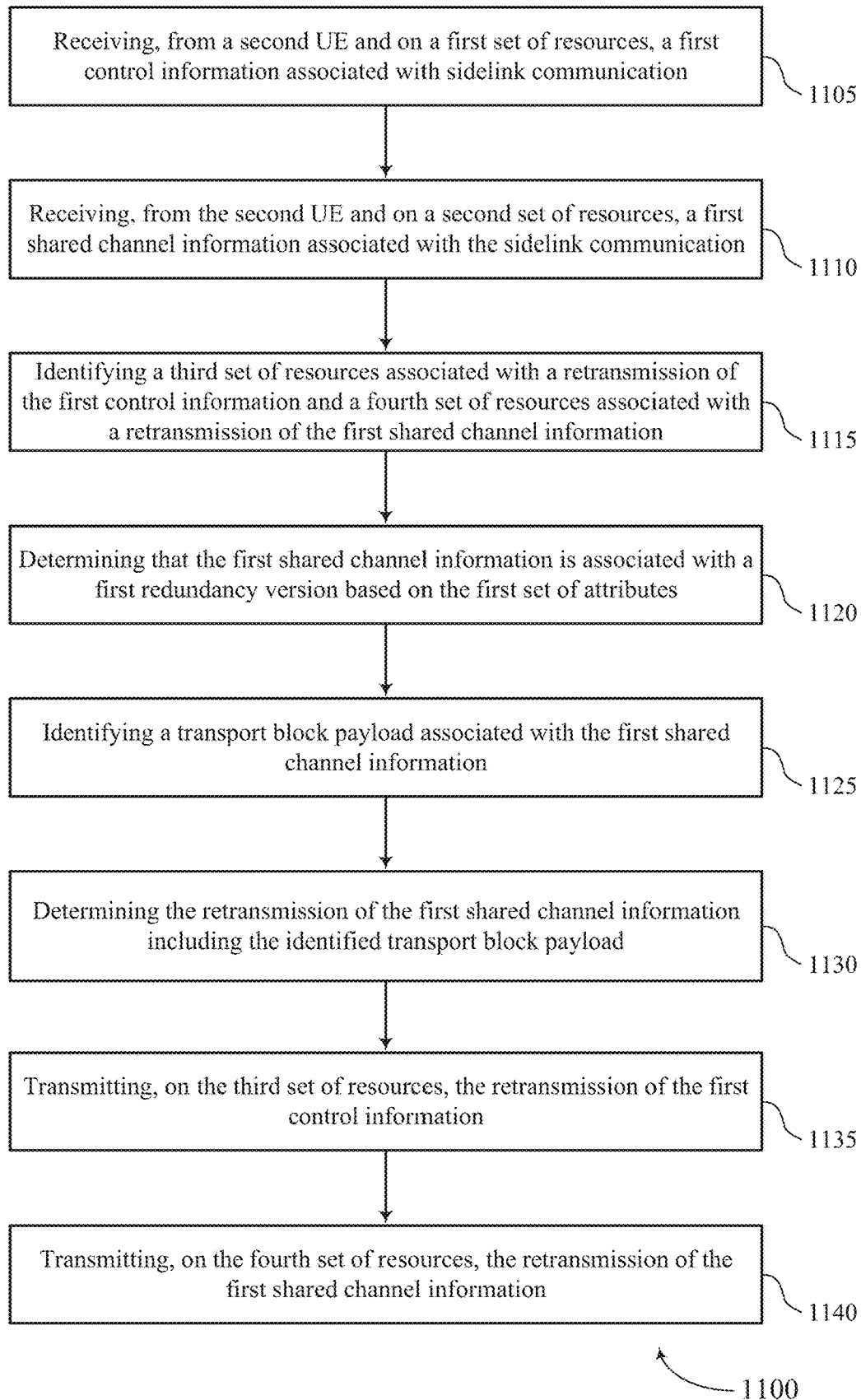

FIG. 11 shows a flowchart illustrating a method 1100 that supports techniques for relaying in sidelink communications in accordance with various aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive, from a second UE and on a first set of resources, a first control information associated with sidelink communication. The operations of 1105 may be performed according to the methods described herein. In some examples, aspects of the operations of 1105 may be performed by a control information component as described with reference to FIGS. 5 through 8.

At 1110, the UE may receive, from the second UE and on a second set of resources, a first shared channel information associated with the sidelink communication. The operations of 1110 may be performed according to the methods described herein. In some examples, aspects of the operations of 1110 may be performed by a shared channel information component as described with reference to FIGS. 5 through 8.

At 1115, the UE may identify a third set of resources associated with a retransmission of the first control information and a fourth set of resources associated with a retransmission of the first shared channel information. The operations of 1115 may be performed according to the methods described herein. In some examples, aspects of the operations of 1115 may be performed by a resource identification component as described with reference to FIGS. 5 through 8.

At 1120, the UE may determine that the first shared channel information is associated with a first redundancy version based on the first set of attributes. The operations of 1120 may be performed according to the methods described herein. In some examples, aspects of the operations of 1120 may be performed by an attribute component as described with reference to FIGS. 5 through 8.

At 1125, the UE may identify a transport block payload associated with the first shared channel information. The operations of 1125 may be performed according to the methods described herein. In some examples, aspects of the operations of 1125 may be performed by a payload component as described with reference to FIGS. 5 through 8.

At 1130, the UE may determine the retransmission of the first shared channel information including the identified transport block payload. The operations of 1130 may be performed according to the methods described herein. In some examples, aspects of the operations of 1130 may be performed by a retransmission determination component as described with reference to FIGS. 5 through 8.

At 1135, the UE may transmit, on the third set of resources, the retransmission of the first control information. The operations of 1135 may be performed according to the methods described herein. In some examples, aspects of the operations of 1135 may be performed by a transmission component as described with reference to FIGS. 5 through 8.

At 1140, the UE may transmit, on the fourth set of resources, the retransmission of the first shared channel information. In some examples, transmitting the retransmission of the first shared channel information includes transmitting the retransmission of the first shared channel information associated with a second redundancy version. The operations of 1140 may be performed according to the methods described herein. In some examples, aspects of the operations of 1140 may be performed by a transmission component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving, from a second UE and on a first set of resources, a first control information associated with sidelink communication;
   receiving, from the second UE and on a second set of resources, a first shared channel information associated with the sidelink communication;
   identifying a third set of resources associated with relaying the first control information received form the second UE and a fourth set of resources associated with relaying of the first shared channel information received from the second UE;
   relaying, to a third UE and on the third set of resources, the first control information associated with the sidelink communication; and
   relaying, to the third UE and on the fourth set of resources, the first shared channel information associated with the sidelink communication, wherein the third UE is different from the second UE.

2. The method of claim 1, further comprising:
   identifying sidelink control information included in a sidelink control channel, wherein receiving the first control information comprises receiving the sidelink control channel on the first set of resources and during a first time period;
   determining, based at least in part on the sidelink control information, a gap between the first time period and a second time period allocated by the second UE for the relaying of the first control information; and
   identifying the third set of resources associated with the relaying of the first control information based at least in part on the first set of resources and the determined gap.

3. The method of claim 2, wherein relaying the first control information comprises:
   transmitting an indication of the sidelink control information in the relaying of the first control information.

4. The method of claim 2, further comprising:
   identifying a first set of attributes associated with the first shared channel information based at least in part on the sidelink control information; and
   identifying a second set of attributes associated with the relaying of the first shared channel information based at least in part on the first set of attributes.

5. The method of claim 4, further comprising:
   determining that the first shared channel information is associated with a first redundancy version based at least in part on the first set of attributes;
   identifying a transport block payload associated with the first shared channel information; and
   determining the relaying of the first shared channel information including the identified transport block payload, wherein relaying the first shared channel information comprises relaying the first shared channel information associated with a second redundancy version.

6. The method of claim 5, wherein a number of bits included in a circular buffer associated with the first redundancy version is different from a number of bits included in a circular buffer associated with the second redundancy version.

7. The method of claim 5, wherein the first set of attributes and the second set of attributes comprise at least one of a physical sidelink shared channel scrambling parameter, a group hopping parameter, an orthogonal code, a cyclic shift, or any combination thereof.

8. The method of claim 1, further comprising:
   including a bit in the relaying of the first control information, wherein a value of the bit indicates that the transmission on the third set of resources is an echo of the first control information.

9. The method of claim 1, further comprising:
   determining that the first control information is associated with a first redundancy version, wherein relaying the first control information comprises relaying the first control information associated with a second redundancy version.

10. The method of claim 9, wherein a first cyclic shift associated with the first redundancy version and a second cyclic shift associated with the second redundancy version are randomly selected.

11. The method of claim 9, wherein the first redundancy version and the second redundancy version are associated with the same cyclic shift.

12. The method of claim 9, wherein a first cyclic shift associated with the first redundancy version is different from a second cyclic shift associated with the second redundancy version.

13. The method of claim 1, wherein the first UE comprises a capability to transmit echo of a transmission.

14. The method of claim 13, wherein the capability is based at least in part on a number of previous transmissions in a subframe, an amount of gap supported by the first UE, or a combination thereof.

15. The method of claim 1, wherein the first UE and the second UE are included in a first coverage area and the second UE and a third UE are included in a second coverage area.

16. The method of claim 1, wherein the first control information comprises a physical sidelink control channel and the first shared channel information comprises a physical sidelink shared channel.

17. An apparatus for wireless communication, comprising:
   a processor,
   memory coupled with the processor; and
   instructions stored in the memory and executable by the processor to cause the apparatus to:
      receive, from a second apparatus and on a first set of resources, a first control information associated with sidelink communication;
      receive, from the second apparatus and on a second set of resources, a first shared channel information associated with the sidelink communication;
      identify a third set of resources associated with relaying the first control information received from the second apparatus and a fourth set of resources associated with relaying of the first shared channel information received from the second apparatus;

relay, to a third apparatus and on the third set of resources, the first control information associated with the sidelink communication; and relay, to a third apparatus and on the fourth set of resources, the first shared channel information associated with the sidelink communication, wherein the third apparatus is different from the second apparatus.

18. The apparatus of claim 17, wherein the instructions are further executable by the processor to cause the apparatus to:

identify sidelink control information included in a sidelink control channel, wherein the instructions to receive the first control information are executable by the processor to cause the apparatus to receive the sidelink control channel on the first set of resources and during a first time period;

determine, based at least in part on the sidelink control information, a gap between the first time period and a second time period allocated by the second apparatus for the relaying of the first control information; and identify the third set of resources associated with the relaying of the first control information based at least in part on the first set of resources and the determined gap.

19. The apparatus of claim 18, wherein the instructions to relay the first control information are executable by the processor to cause the apparatus to:

transmit an indication of the sidelink control information in the relaying of the first control information.

20. The apparatus of claim 18, wherein the instructions are further executable by the processor to cause the apparatus to:

identify a first set of attributes associated with the first shared channel information based at least in part on the sidelink control information; and identify a second set of attributes associated with the relaying of the first shared channel information based at least in part on the first set of attributes.

21. The apparatus of claim 20, wherein the instructions are further executable by the processor to cause the apparatus to:

determine that the first shared channel information is associated with a first redundancy version based at least in part on the first set of attributes;

identify a transport block payload associated with the first shared channel information; and determine the relaying of the first shared channel information including the identified transport block payload, wherein the instructions to relay the first shared channel information are executable by the processor to cause the apparatus to relay the first shared channel information associated with a second redundancy version.

22. The apparatus of claim 21, wherein a number of bits included in a circular buffer associated with the first redundancy version is different from a number of bits included in a circular buffer associated with the second redundancy version.

23. The apparatus of claim 21, wherein the first set of attributes and the second set of attributes comprise at least one of a physical sidelink shared channel scrambling parameter, a group hopping parameter, an orthogonal code, a cyclic shift, or any combination thereof.

24. The apparatus of claim 17, wherein the instructions are further executable by the processor to cause the apparatus to:

include a bit in the relaying of the first control information, wherein a value of the bit indicates that the relaying on the third set of resources is an echo of the first control information.

25. An apparatus for wireless communication, comprising:

means for receiving, from a second apparatus and on a first set of resources, a first control information associated with sidelink communication;

means for receiving, from the second apparatus and on a second set of resources, a first shared channel information associated with the sidelink communication;

means for identifying a third set of resources associated with relaying the first control information and a fourth set of resources associated with relaying the first shared channel information received from the second apparatus;

means for relaying, to a third apparatus and on the third set of resources, the first control information associated with the sidelink communication; and means for relaying, to the third apparatus and on the fourth set of resources, the first shared channel information associated with the sidelink communication, wherein the third apparatus is different from the second apparatus.

26. The apparatus of claim 25, further comprising:

means for identifying sidelink control information included in a sidelink control channel, wherein the means for receiving the first control information comprises means for receiving the sidelink control channel on the first set of resources and during a first time period;

means for determining, based at least in part on the sidelink control information, a gap between the first time period and a second time period allocated by the second apparatus for the relaying of the first control information; and means for identifying the third set of resources associated with the relaying of the first control information based at least in part on the first set of resources and the determined gap.

27. The apparatus of claim 26, wherein the means for relaying the first control information comprises:

means for transmitting an indication of the sidelink control information in the relaying of the first control information.

28. The apparatus of claim 26, further comprising:

means for identifying a first set of attributes associated with the first shared channel information based at least in part on the sidelink control information; and means for identifying a second set of attributes associated with the relaying of the first shared channel information based at least in part on the first set of attributes.

29. A non-transitory computer-readable medium storing code for wireless communication at a first user equipment (UE), the code comprising instructions executable by a processor to:

receive, from a second UE and on a first set of resources, a first control information associated with sidelink communication;

receive, from the second UE and on a second set of resources, a first shared channel information associated with the sidelink communication;

identify a third set of resources associated with relaying the first control information received from the second UE and a fourth set of resources associated with relaying the first shared channel information received from the second UE;

relay, to a third UE and on the third set of resources, the first shared control information associated with the sidelink communication; and relay, to the third UE and on the fourth set of resources, the first shared channel information associated with the sidelink communication, wherein the third UE is different from the second UE.

30. The non-transitory computer-readable medium of claim 29, wherein the instructions are further executable to:

identify sidelink control information included in a sidelink control channel, wherein the instructions to receive the first control information are executable by the processor to receive the sidelink control channel on the first set of resources and during a first time period;

determine, based at least in part on the sidelink control information, a gap between the first time period and a second time period allocated by the second UE for the relaying of the first control information; and identify the third set of resources associated with the relaying of the first control information based at least in part on the first set of resources and the determined gap.

* * * * *